R. E. DODSON.
PIPE COUPLING.
APPLICATION FILED MAY 14, 1913.
1,115,912.
Patented Nov. 3, 1914.
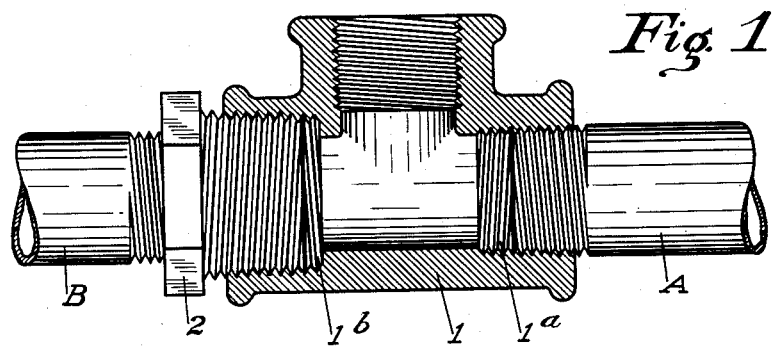
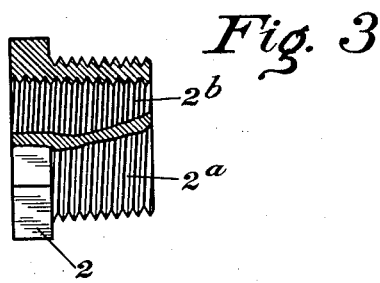
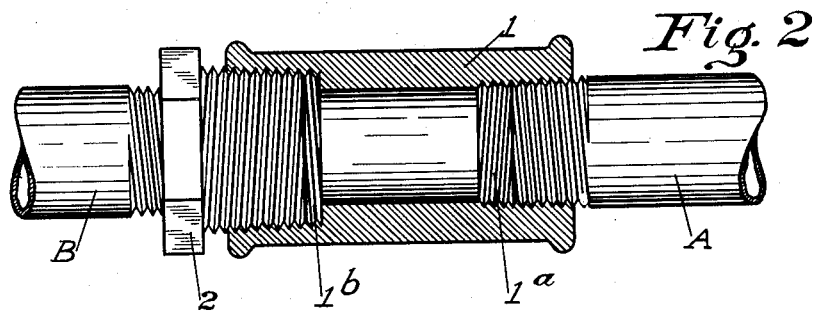
WITNESS
Grove E. Herrmann
Elmer E. Rodabaugh.
INVENTOR
ROYAL E. DODSON
BY A. B. Bowman
ATTORNEY

UNITED STATES PATENT OFFICE.

ROYAL E. DODSON, OF SAN DIEGO, CALIFORNIA.

PIPE-COUPLING.

1,115,912.  Specification of Letters Patent.  Patented Nov. 3, 1914.

Application filed May 14, 1913. Serial No. 767,584.

*To all whom it may concern:*

Be it known that I, ROYAL E. DODSON, a citizen of the United States, and a resident of San Diego, county of San Diego, and State of California, have invented certain new and useful Improvements in Pipe-Couplings, of which the following is a specification.

My invention relates to a coupling to be used for connecting the ends of two or more pipes together, or for taking out a coupling for replacing it with a T when a branch is desired; and the objects of my invention are, first, to provide a coupling of this class in which there are no gaskets as is usual in the ordinary union, second, to provide a coupling that is very simple, compact, and easily installed, third, to provide such a coupling that may be placed in where the pipes are already laid without the necessity of raising the pipe and cutting a new thread, and fourth, to provide such a coupling which may be used where it is desired to use a T where an elbow is already placed, without cutting new threads on the pipes.

With these and other objects in view, as will appear hereinafter, my invention consists of certain novel features of construction, combination and arrangement of parts as will be hereinafter described in detail and particularly set forth in the appended claims, reference being had to the accompanying drawings and to the characters of reference thereon, which form a part of this specification, in which:

Figure 1 is a sectional view of a T coupling with the bushing and pipe shown in elevation in connection therewith, Fig. 2 is a sectional view of an ordinary straight coupling with the bushing and pipe shown in elevation in connection therewith, and Fig. 3 is a side elevational view of my bushing showing a portion broken away and in section to facilitate the illustration.

Similar characters of reference refer to similar parts throughout the several views.

The T or coupling 1 and bushing 2, constitute the principal parts of my coupling. The T or coupling at its one end is the same as any ordinary T or coupling threaded with a right hand internal thread $1^a$ to fit the pipe A in connection with which it is to be used. The other end of the T or coupling 1 has a larger internal pipe thread $1^b$ which is left hand, adapted for the bushing 2, which is provided with a left hand external thread $2^a$. This bushing 2 is also provided with a right hand internal thread $2^b$ adapted for the end of the pipe B of the same size as the pipe A in the other end of the coupling. It is also provided with a narrow polygonal external surface adapted to facilitate the turning of the same.

It is obvious that with this construction and with the ordinary pipes and the ends provided with right hand threads and an ordinary coupling mounted thereon where there is a chance for the pipes to give, the coupling may be removed by cutting it out if necessary and a T placed there of this class using the bushing in connection therewith to form a tight coupling and allowing for a branch from the line; that where an elbow is used and it is desired to run one of the lines straight by using a T these two pieces, T 1 and bushing 2, may be placed in the place of the elbow and the line run as desired, that there are no gaskets used and the fitting will be tight.

Having thus described my invention, what I claim as new and desired to secure by Letters Patent is:

1. In a coupling the combination of two pipes of the same size in alinement and spaced apart from each other at their ends, each provided with a right hand tapered pipe thread tapered toward each other on their ends, a T with an outwardly tapering right hand thread in one of its ends screwed tightly onto the end of one of said pipes, a bushing provided with a right hand internal tapered pipe thread adapted to screw on the end of the other pipe and provided with a left hand internal tapered thread over said internal thread and a left hand internal tapered thread in the other end of said T into which said bushing is screwed.

2. In a coupling the combination of two pipes of the same size in alinement and spaced apart from each other at their ends, each provided with a right hand tapered pipe thread tapered toward each other on their ends, a coupling with an outwardly tapering right hand thread in one of its ends screwed tightly onto the end of one of said pipes, a bushing provided with a right hand internal tapered pipe thread adapted to screw on the end of the other pipe and provided with a left hand internal tapered thread over said internal thread and a left hand internal tapered thread in the other end of said coupling into which said bushing is screwed.

3. In a pipe coupling the combination of a T of the conventional type provided with a right hand thread tapering outwardly threaded only part way therein at one of its ends, the opening in its other end being larger and provided with a left hand internal tapered thread extending only part way therein, a bushing threaded internally with a right hand tapered pipe thread, but threaded externally and over said internal thread with a left hand tapered thread adapted to fit the left hand tapered thread in said T and two pipes of the same size each provided with right hand external threads tapering toward their ends, the one adapted to be screwed into the one end of said T until a tight joint is formed and the other adapted to screw into said bushing until a tight joint is formed between said pipe and said bushing.

In testimony whereof, I have hereunto subscribed my name in the presence of two subscribing witnesses.

ROYAL E. DODSON.

Witnesses:
 ELMER E. RODABAUGH,
 ABRAM B. BOWMAN.